UNITED STATES PATENT OFFICE.

FREDERICK WILHELM SAMUEL VALENTINER, DECEASED, LATE OF LEIPZIG, GERMANY; ALFRED VICTOR RICHTER, ADMINISTRATOR, ASSIGNOR TO THE FIRM OF VALENTINER AND SCHWARZ, OF LEIPZIG-PLAGWITZ, GERMANY.

PROCESS OF PRODUCING A SULFUR COMPOUND OF QUININ.

953,187.  Specification of Letters Patent.  Patented Mar. 29, 1910.

No Drawing.  Application filed May 15, 1909. Serial No. 496,331.

*To all whom it may concern:*

Be it known that FREDERICK WILHELM SAMUEL VALENTINER, late a subject of the Emperor of Germany and residing at Leipzig, Germany, the administrator of whose estate is ALFRED VICTOR RICHTER, a subject of the Emperor of Germany, residing at Leipzig, Germany, has invented a new and useful Improvement in Processes of Producing Sulfur Compounds of Quinin, of which the following is a specification.

In the process at present practiced of sulfurizing primary and secondary amins and diamins by fusing sulfur with amin the presence of sulfureted hydrogen has invariably been observed and it was necessary to raise the temperature far above the fusion point of the amin; with $\beta$ dinaphthylamin for instance to 250° C., which is about 75° C. higher than the fusion point of the dinaphthylamin. However, with attempts to produce a sulfur compound of quinin, a tertiary amin under observance of the above conditions, carbon is formed. Only by altering the conditions are useful products obtained, in which case it is observed that then the generation of sulfureted hydrogen does not take place at all. In consequence it must be assumed that the modified process of sulfurizing is different from the usual action, and that probably one of the two oxygen atoms of the quinin is replaced by sulfur. In any case the course of the reaction was not one that could be foreseen. Further, the unsuccessful attempts of E. Schmidt (*Berichte der Deutschen Chemischen Gesellschaft*, VIII year, 1875, page 1274) to sulfurize quinin and cinchonin by means of sulfureted hydrogen in an alcohol solution may be instanced; the resultant products of Schmidt's process consisted of a mixture of distinct substances. By addition of mineral acids oily particles of hydrogen hyper-sulfid were separated. It has now been found that by the simple action of heat, sulfur is introduced into the quinin molecule when sulfur is fused with the base at a temperature considerably below the fusion point of the latter.

The process of obtaining a monothio compound is as follows: 100 grams of an anhydrous quinin base are thoroughly pulverized with about 20 grams of sulfur and slowly heated to about 142° C. to 150° C., in a retort placed within an oil bath. With continuous stirring the mixture begins to clot and softens slightly at about 120° C. If the temperature is maintained at 145° C., during about half an hour, a powder of a gray-brown color is obtained which after cooling may readily be shaken out of the retort. The fine powder-like substance is then dissolved in an aqueous solution of hydrochloric acid, particles containing carbon as also any free sulfur being removed by filtration. The base contained in the filtrate is precipitated with the aid of ammonia, is recovered in the usual manner and is then purified by re-solution.

The new quinin base is of a yellow color, contains sulfur (silver test), and changes to a brown color with incrustation at 120° C., and fuses at 135° C., forming a transparent dark brown mass.

The chemical reaction involved is represented by the following equation:

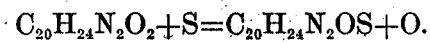

$$C_{20}H_{24}N_2O_2 + S = C_{20}H_{24}N_2OS + O.$$

The product obtained in the manner above described is a free thio base of quinin and is more particularly characterized by reference to its solubility in organic solutions.

The free thio base of quinin is partly soluble in cold or warm alcohol-ether, insoluble in ether; readily soluble in alcohol, slightly soluble in cold and hot benzol, fuses when heated, is soluble with difficulty in cold or hot chloroform, and slightly soluble in acetone.

Analysis has given the following values for the S— and N— contents:—

1. For the S— contents.

| Substance. | BaSO$_4$. | Per cent. |
|---|---|---|
| a. 2.0830 | 13.9000 | |
| 1.9045 | 13.7775 | |
| 0.1785 | 0.1225 | 9.42% S. |
| b. 2.1170 | 13.8940 | |
| 1.9470 | 13.7775 | |
| 0.1700 | 0.1165 | 9.41% S. |
| c. 2.5245 | 13.9235 | |
| 2.3155 | 13.7780 | |
| 0.2090 | 0.1455 | 9.56% S. |

| Substance. | $BaSO_4$. | Per cent. |
|---|---|---|
| d. 2.2520 | 13.8765 | |
| 2.1120 | 13.7785 | |
| 0.1400 | 0.0980 | 9.61% S. |

Giving an average of 9.50% S. Calculated for $C_{20}H_{24}N_2OS$, 9.41% S.

2. For the N— contents.

| Substance. | Pt. | |
|---|---|---|
| a. 2.1935 | 13.8710 | |
| 2.0380 | 13.7790 | |
| 0.1555 | 0.0920 | 8.41% N. |
| b. 2.2980 | 13.8560 | |
| 2.1680 | 13.7790 | |
| 0.1300 | 0.0770 | 8.51% N. |

Giving an average of 8.46% N. Calculated for $C_{20}H_{24}N_2OS$, 8.24% N.

The free thio compound of quinin produces, in combination with inorganic and organic acids, salts which crystallize with difficulty, and is intended to be used in the arts of pharmacy and cosmetics.

Having described the invention what is claimed and desired to secure by Letters Patent of the United States is:—

1. The process of producing a sulfureted compound of quinin of the general formula $C_{20}H_{24}N_2OS$ consisting in fusing sulfur with the free base at a temperature considerably below the fusion point of the latter, as described.

2. A compound of quinin and sulfur in which one of the oxygen atoms of the quinin is replaced by sulfur, which changes to a brown color with incrustation at 120° C. and fuses at 135° C., forming a transparent dark brown mass, said compound being partly soluble in cold or warm alcohol-ether, insoluble in ether, readily soluble in alcohol, and slightly soluble in acetone.

In testimony whereof I have signed my name to this specification in the presence of two subscribing witnesses.

ALFRED VICTOR RICHTER,
*Administrator of the estate of Frederick Wilhelm Samuel Valentiner, deceased.*

Witnesses:
HEINRICH GOUTENT,
RUDOLPH M. FRICKE.